(12) United States Patent
Russ et al.

(10) Patent No.: US 7,516,470 B2
(45) Date of Patent: Apr. 7, 2009

(54) LOCALLY-UPDATED INTERACTIVE PROGRAM GUIDE

(75) Inventors: Samuel H. Russ, Lawrenceville, GA (US); Michael A. Gaul, Lawrenceville, GA (US)

(73) Assignee: Cisco Technology, Inc., Jose, CA (US)

( * ) Notice: Subject to any disclaimer, the term of this patent is extended or adjusted under 35 U.S.C. 154(b) by 351 days.

(21) Appl. No.: 10/212,017

(22) Filed: Aug. 2, 2002

(65) Prior Publication Data

US 2004/0025179 A1 Feb. 5, 2004

(51) Int. Cl.
*G06F 13/00* (2006.01)
*G06F 3/00* (2006.01)
*H04N 5/445* (2006.01)
*H04N 7/16* (2006.01)

(52) U.S. Cl. .............................. 725/48; 725/40; 725/49; 725/141

(58) Field of Classification Search .................. 725/40, 725/48, 49, 141
See application file for complete search history.

(56) References Cited

U.S. PATENT DOCUMENTS

| | | | |
|---|---|---|---|
| 4,215,366 A | 7/1980 | Davidson | |
| 4,290,081 A | 9/1981 | Foerster | 358/4 |
| 4,439,784 A | 3/1984 | Furukawa et al. | |
| 4,535,355 A | 8/1985 | Arn et al. | |
| 4,540,958 A | 9/1985 | Neyens et al. | 332/16 |
| 4,578,533 A | 3/1986 | Pierce | |
| 4,686,564 A | 8/1987 | Masuko et al. | |
| 4,706,121 A | 11/1987 | Young | |
| 4,751,578 A | 6/1988 | Reiter et al. | |
| 4,885,803 A | 12/1989 | Hermann et al. | |
| 4,908,713 A | 3/1990 | Levine | |
| 4,916,532 A | 4/1990 | Streck et al. | |
| 4,963,994 A | 10/1990 | Levine | |
| 4,963,995 A | 10/1990 | Lang | |
| 5,010,299 A | 4/1991 | Nishizawa et al. | |
| 5,010,399 A | 4/1991 | Goodman et al. | 358/85 |
| 5,038,211 A | 8/1991 | Hallenbeck | |
| 5,048,054 A | 9/1991 | Eyuboglu et al. | |
| 5,251,074 A | 10/1993 | Hamma et al. | 360/10.1 |
| 5,253,066 A | 10/1993 | Vogel | |
| 5,293,357 A | 3/1994 | Hallenbeck | |
| 5,406,626 A | 4/1995 | Ryan | 380/9 |
| 5,412,416 A | 5/1995 | Nemirofsky | |

(Continued)

FOREIGN PATENT DOCUMENTS

EP 0912054 4/1999

(Continued)

OTHER PUBLICATIONS

Microsoft Computer Dictionary, 1999, Microsoft press, 4th edition, p. 123.*

(Continued)

*Primary Examiner*—Hunter B. Lonsberry

(57) ABSTRACT

A method for providing an interactive program guide (IPG) includes receiving from a user a request for an IPG, and providing the user with an IPG that includes listings that were received by a digital home communication terminal (DHCT) via a subscriber television network, as well as other listings that were not received by the DHCT via the subscriber television network.

19 Claims, 12 Drawing Sheets

U.S. PATENT DOCUMENTS

| | | |
|---|---|---|
| 5,479,268 A | 12/1995 | Young et al. |
| 5,481,542 A | 1/1996 | Logston et al. |
| 5,508,815 A | 4/1996 | Levine |
| 5,515,377 A | 5/1996 | Home et al. |
| 5,524,051 A | 6/1996 | Ryan ............................ 380/9 |
| 5,568,272 A | 10/1996 | Levine |
| 5,574,964 A | 11/1996 | Hamlin |
| 5,579,308 A | 11/1996 | Humpleman |
| 5,590,195 A | 12/1996 | Ryan ............................ 380/9 |
| 5,600,364 A | 2/1997 | Hendricks et al. |
| 5,600,573 A | 2/1997 | Hendricks et al. |
| 5,600,707 A | 2/1997 | Miller, II |
| 5,621,793 A | 4/1997 | Bednarek et al. |
| 5,638,423 A | 6/1997 | Grube et al. |
| 5,666,151 A | 9/1997 | Kondo et al. |
| 5,682,206 A | 10/1997 | Wehmeyer et al. .......... 348/563 |
| 5,699,105 A | 12/1997 | Chen et al. |
| 5,701,383 A | 12/1997 | Russo et al. ................... 386/46 |
| 5,708,961 A | 1/1998 | Hylton et al. ................. 455/4.2 |
| 5,714,945 A | 2/1998 | Sakuma et al. |
| 5,715,020 A | 2/1998 | Kuroiwa et al. |
| 5,715,277 A | 2/1998 | Goodson et al. |
| 5,751,806 A | 5/1998 | Ryan ............................ 380/9 |
| 5,758,257 A | 5/1998 | Herz et al. |
| 5,774,527 A | 6/1998 | Handelman et al. |
| 5,787,472 A | 7/1998 | Dan et al. ..................... 711/134 |
| 5,793,413 A | 8/1998 | Hylton et al. ................. 348/12 |
| 5,793,414 A | 8/1998 | Shaffer |
| 5,796,442 A | 8/1998 | Gove et al. |
| 5,808,659 A | 9/1998 | Coutinho et al. |
| 5,809,204 A | 9/1998 | Young et al. |
| 5,828,403 A | 10/1998 | DeRodeff et al. .............. 348/7 |
| 5,835,128 A | 11/1998 | MacDonald et al. |
| 5,851,149 A | 12/1998 | Xidos et al. |
| 5,867,485 A | 2/1999 | Chambers et al. |
| 5,872,644 A | 2/1999 | Yamazaki et al. |
| 5,883,677 A | 3/1999 | Hofmann |
| 5,886,732 A | 3/1999 | Humpleman ................. 348/10 |
| 5,886,753 A | 3/1999 | Shinyagaito et al. |
| 5,915,068 A | 6/1999 | Levine |
| 5,920,801 A | 7/1999 | Thomas et al. |
| 5,930,247 A | 7/1999 | Miller, II et al. |
| 5,936,660 A | 8/1999 | Gurantz |
| 5,940,073 A | 8/1999 | Klosterman et al. |
| 5,940,387 A | 8/1999 | Humpleman |
| 5,970,386 A | 10/1999 | Williams |
| 5,983,068 A | 11/1999 | Tomich et al. |
| 5,990,927 A | 11/1999 | Hendricks et al. |
| 5,995,258 A | 11/1999 | Weber et al. |
| 6,005,861 A | 12/1999 | Humpleman |
| 6,014,546 A | 1/2000 | Georges et al. |
| 6,026,150 A | 2/2000 | Frank |
| 6,037,998 A | 3/2000 | Usui et al. ................... 348/569 |
| 6,055,355 A | 4/2000 | Lee ............................. 386/70 |
| 6,061,449 A | 5/2000 | Candelore et al. |
| 6,073,122 A | 6/2000 | Wool |
| 6,091,320 A | 7/2000 | Odinak .................. 340/310.01 |
| 6,100,936 A | 8/2000 | Jordan et al. |
| 6,118,873 A | 9/2000 | Lotspiech et al. |
| 6,151,493 A | 11/2000 | Sasakura et al. |
| 6,169,543 B1 | 1/2001 | Wehmeyer ................. 345/327 |
| 6,172,712 B1 | 1/2001 | Beard ........................ 348/552 |
| 6,181,784 B1 | 1/2001 | Duran et al. ............. 379/93.21 |
| 6,182,287 B1* | 1/2001 | Schneidewend et al. ....... 725/48 |
| 6,215,526 B1 | 4/2001 | Barton et al. ................ 348/473 |
| 6,219,839 B1* | 4/2001 | Sampsell ..................... 725/40 |
| 6,229,895 B1 | 5/2001 | Son et al. |
| 6,233,389 B1 | 5/2001 | Barton et al. ................ 386/46 |
| 6,240,555 B1 | 5/2001 | Shoff et al. |
| 6,243,142 B1 | 6/2001 | Mugura et al. |
| 6,263,503 B1 | 7/2001 | Margulis |
| 6,285,746 B1 | 9/2001 | Duran et al. ............. 379/93.21 |
| 6,286,140 B1 | 9/2001 | Ivanyi |
| 6,286,142 B1 | 9/2001 | Ehreth |
| 6,305,017 B1 | 10/2001 | Satterfield ..................... 725/44 |
| 6,310,886 B1 | 10/2001 | Barton ........................ 370/462 |
| 6,317,884 B1 | 11/2001 | Eames et al. ................... 725/78 |
| 6,324,338 B1 | 11/2001 | Wood et al. ................... 386/83 |
| 6,327,418 B1 | 12/2001 | Barton ........................ 386/46 |
| 6,330,334 B1 | 12/2001 | Ryan ......................... 380/237 |
| 6,353,929 B1 | 3/2002 | Houston |
| 6,377,782 B1 | 4/2002 | Bishop et al. |
| 6,415,031 B1 | 7/2002 | Colligan et al. |
| 6,418,558 B1 | 7/2002 | Roberts et al. |
| 6,421,706 B1 | 7/2002 | McNeill et al. |
| 6,424,947 B1 | 7/2002 | Tsuria et al. |
| 6,442,755 B1 | 8/2002 | Lemmons et al. |
| 6,452,923 B1 | 9/2002 | Gerszberg et al. |
| 6,481,013 B1 | 11/2002 | Dinwiddie et al. |
| 6,483,548 B1 | 11/2002 | Allport |
| 6,493,875 B1 | 12/2002 | Eames et al. |
| 6,496,980 B1 | 12/2002 | Tillman et al. |
| 6,505,348 B1 | 1/2003 | Knowles et al. |
| 6,526,581 B1 | 2/2003 | Edson ......................... 725/74 |
| 6,530,085 B1 | 3/2003 | Perlman |
| 6,535,717 B1 | 3/2003 | Matsushima et al. |
| 6,536,041 B1 | 3/2003 | Knudson et al. |
| 6,542,610 B2 | 4/2003 | Traw et al. |
| 6,567,981 B1 | 5/2003 | Jeffrey |
| 6,578,070 B1 | 6/2003 | Weaver et al. |
| 6,588,017 B1 | 7/2003 | Calderone ................... 725/120 |
| 6,594,798 B1 | 7/2003 | Chou et al. |
| 6,614,936 B1 | 9/2003 | Wu et al. |
| 6,622,304 B1 | 9/2003 | Carhart |
| 6,622,307 B1 | 9/2003 | Ho |
| 6,637,031 B1 | 10/2003 | Chou |
| 6,681,326 B2 | 1/2004 | Son et al. |
| 6,697,426 B1 | 2/2004 | Van Der Schaar et al. |
| 6,697,489 B1 | 2/2004 | Candelore |
| 6,704,028 B2* | 3/2004 | Wugofski ................... 715/719 |
| 6,711,132 B2 | 3/2004 | Lazarus |
| 6,735,221 B1 | 5/2004 | Cherubini |
| 6,735,312 B1 | 5/2004 | Abdalla et al. |
| 6,757,906 B1 | 6/2004 | Look et al. |
| 6,766,526 B1* | 7/2004 | Ellis ............................. 725/57 |
| 6,771,908 B2 | 8/2004 | Eijk et al. |
| 6,789,106 B2 | 9/2004 | Eyer et al. |
| 6,791,995 B1 | 9/2004 | Azenkot et al. |
| 6,795,205 B1 | 9/2004 | Gacek |
| 6,804,357 B1 | 10/2004 | Ikonen et al. |
| 6,816,194 B2 | 11/2004 | Zhang et al. |
| 6,864,778 B2 | 3/2005 | Musschebroeck et al. |
| 6,868,292 B2* | 3/2005 | Ficco et al. ..................... 700/19 |
| 6,870,570 B1 | 3/2005 | Bowser |
| 6,889,385 B1 | 5/2005 | Rakib et al. |
| 6,904,522 B1 | 6/2005 | Benardeau et al. |
| 6,915,529 B1 | 7/2005 | Suematsu et al. |
| 6,930,788 B1 | 8/2005 | Iwamoto et al. |
| 6,957,344 B1 | 10/2005 | Goldshlag et al. |
| 6,996,837 B1 | 2/2006 | Miura et al. |
| 7,020,890 B1 | 3/2006 | Suematsu et al. |
| 7,047,305 B1 | 5/2006 | Brooks et al. |
| 7,054,289 B1 | 5/2006 | Foster et al. |
| 7,093,295 B1 | 8/2006 | Saito |
| 7,127,734 B1 | 10/2006 | Amit |
| 7,139,398 B2 | 11/2006 | Candelore et al. |
| 7,140,033 B1 | 11/2006 | Durden et al. |
| 7,146,628 B1 | 12/2006 | Gordon et al. |
| 7,155,012 B2 | 12/2006 | Candelore et al. |
| 7,184,550 B2 | 2/2007 | Graunke |
| 7,190,901 B2 | 3/2007 | Farmer et al. |
| 7,209,667 B2 | 4/2007 | Lindblad |
| 7,222,358 B2 | 5/2007 | Levinson et al. |
| 7,233,669 B2 | 6/2007 | Candelore |

| | | |
|---|---|---|
| 7,260,829 B1 | 8/2007 | Hendricks et al. |
| 7,310,355 B1 | 12/2007 | Krein et al. |
| 7,360,233 B2 | 4/2008 | Russ et al. |
| 7,360,235 B2 | 4/2008 | Davies et al. |
| 2001/0005906 A1 | 6/2001 | Humpleman |
| 2001/0017920 A1 | 8/2001 | Son et al. |
| 2001/0030664 A1 | 10/2001 | Shulman et al. |
| 2001/0039660 A1 | 11/2001 | Vasilevsky et al. |
| 2002/0002707 A1 | 1/2002 | Ekel et al. |
| 2002/0007485 A1 | 1/2002 | Rodriguez et al. |
| 2002/0010936 A1 | 1/2002 | Adam |
| 2002/0019984 A1 | 2/2002 | Rakib |
| 2002/0035726 A1 | 3/2002 | Corl |
| 2002/0035729 A1 | 3/2002 | Diep |
| 2002/0040475 A1 | 4/2002 | Yap et al. |
| 2002/0044762 A1 | 4/2002 | Wood et al. |
| 2002/0051200 A1 | 5/2002 | Chang et al. |
| 2002/0051581 A1 | 5/2002 | Takeuchi et al. |
| 2002/0056112 A1 | 5/2002 | Dureau et al. |
| 2002/0059615 A1 | 5/2002 | Okawara et al. |
| 2002/0059617 A1 | 5/2002 | Terakado et al. |
| 2002/0059637 A1 | 5/2002 | Rakib |
| 2002/0066101 A1 | 5/2002 | Gordon et al. |
| 2002/0067437 A1 | 6/2002 | Tsubouchi et al. |
| 2002/0069417 A1 | 6/2002 | Kliger et al. |
| 2002/0083438 A1 | 6/2002 | So et al. |
| 2002/0087996 A1 | 7/2002 | Bi et al. |
| 2002/0090198 A1 | 7/2002 | Rosenberg et al. |
| 2002/0095673 A1 | 7/2002 | Leung et al. |
| 2002/0095689 A1 | 7/2002 | Novak |
| 2002/0100041 A1 | 7/2002 | Rosenberg et al. |
| 2002/0104001 A1 | 8/2002 | Lotspiech et al. |
| 2002/0108121 A1 | 8/2002 | Alao et al. |
| 2002/0116626 A1 | 8/2002 | Wood |
| 2002/0133558 A1 | 9/2002 | Fenno et al. |
| 2002/0137517 A1 | 9/2002 | Williams et al. |
| 2002/0141582 A1 | 10/2002 | Kocher et al. |
| 2002/0144262 A1 | 10/2002 | Plotnick et al. |
| 2002/0146237 A1 | 10/2002 | Safadi ............... 386/94 |
| 2002/0154892 A1 | 10/2002 | Hoshen et al. |
| 2002/0157112 A1 | 10/2002 | Kuhn |
| 2002/0166124 A1 | 11/2002 | Gurantz et al. |
| 2002/0174444 A1 | 11/2002 | Gatto et al. |
| 2002/0178445 A1 | 11/2002 | Eldering |
| 2002/0187779 A1 | 12/2002 | Freeny |
| 2002/0194596 A1 | 12/2002 | Srivastava |
| 2003/0005300 A1 | 1/2003 | Noble et al. |
| 2003/0009763 A1 | 1/2003 | Crinon et al. |
| 2003/0026423 A1 | 2/2003 | Unger et al. |
| 2003/0028886 A1 | 2/2003 | Wang et al. |
| 2003/0028890 A1 | 2/2003 | Swart et al. |
| 2003/0044165 A1 | 3/2003 | Wood et al. |
| 2003/0063003 A1 | 4/2003 | Bero et al. |
| 2003/0063814 A1 | 4/2003 | Herley |
| 2003/0097563 A1 | 5/2003 | Moroney et al. |
| 2003/0108199 A1 | 6/2003 | Pinder et al. |
| 2003/0108336 A1 | 6/2003 | Schramel |
| 2003/0142664 A1 | 7/2003 | Gerszberg et al. |
| 2003/0145336 A1 | 7/2003 | Matsuzaki et al. |
| 2003/0149986 A1 | 8/2003 | Mayfield et al. |
| 2003/0149991 A1 | 8/2003 | Reidhead et al. |
| 2003/0159140 A1 | 8/2003 | Candelore |
| 2003/0159157 A1 | 8/2003 | Chan |
| 2003/0181160 A1 | 9/2003 | Hirsch |
| 2003/0202772 A1 | 10/2003 | Dow et al. |
| 2003/0204856 A1 | 10/2003 | Buxton |
| 2003/0207672 A1 | 11/2003 | Dang et al. |
| 2003/0233667 A1 | 12/2003 | Umipig et al. |
| 2004/0028216 A1 | 2/2004 | Freyman |
| 2004/0032902 A1 | 2/2004 | Koifman et al. |
| 2004/0032950 A1 | 2/2004 | Graunke |
| 2004/0034874 A1 | 2/2004 | Hord et al. |
| 2004/0040035 A1 | 2/2004 | Carlucci et al. |
| 2004/0051638 A1 | 3/2004 | Green |
| 2004/0054771 A1 | 3/2004 | Roe et al. |
| 2004/0064714 A1 | 4/2004 | Carr |
| 2004/0068739 A1 | 4/2004 | Russ |
| 2004/0068747 A1 | 4/2004 | Robertson |
| 2004/0068754 A1 | 4/2004 | Russ |
| 2004/0078825 A1 | 4/2004 | Murphy |
| 2004/0107445 A1 | 6/2004 | Amit |
| 2004/0109497 A1 | 6/2004 | Koval |
| 2004/0128681 A1 | 7/2004 | Hancock |
| 2004/0128682 A1 | 7/2004 | Liga |
| 2004/0172658 A1 | 9/2004 | Rakib et al. |
| 2004/0177381 A1 | 9/2004 | Kliger et al. |
| 2004/0221304 A1 | 11/2004 | Sparrel |
| 2004/0255326 A1 | 12/2004 | Hicks et al. |
| 2004/0257976 A1 | 12/2004 | Alsobrook et al. |
| 2004/0261126 A1 | 12/2004 | Addington et al. |
| 2005/0022248 A1 | 1/2005 | Robertson et al. |
| 2005/0028190 A1 | 2/2005 | Rodriguez et al. |
| 2005/0028208 A1 | 2/2005 | Ellis et al. |
| 2005/0042999 A1 | 2/2005 | Rappaport |
| 2005/0050557 A1 | 3/2005 | Gabry |
| 2005/0063422 A1 | 3/2005 | Lazar et al. |
| 2005/0155052 A1 | 7/2005 | Ostrowska |
| 2005/0235323 A1 | 10/2005 | Ellis et al. |
| 2005/0251827 A1 | 11/2005 | Ellis et al. |
| 2005/0262542 A1 | 11/2005 | DeWeese et al. |
| 2006/0069645 A1 | 3/2006 | Chen et al. |
| 2006/0218591 A1 | 9/2006 | Billmaier et al. |
| 2006/0259584 A1 | 11/2006 | Watson et al. |

FOREIGN PATENT DOCUMENTS

| | | |
|---|---|---|
| EP | 0989557 | 3/2000 |
| EP | 1028551 | 8/2000 |
| EP | 107600 | 6/2001 |
| EP | 1117214 | 7/2001 |
| EP | 1175087 | 7/2001 |
| EP | 1213919 | 6/2002 |
| EP | 1443766 | 8/2004 |
| EP | 1463324 | 9/2004 |
| WO | WO 95/25402 | 9/1995 |
| WO | WO 98/26584 | 6/1998 |
| WO | WO 98/37648 | 8/1998 |
| WO | WO 99/01984 | 1/1999 |
| WO | WO 99/35844 | 7/1999 |
| WO | WO 99/65244 | 12/1999 |
| WO | WO 00/35201 | 6/2000 |
| WO | WO 01/47234 | 6/2001 |
| WO | WO 01/56286 | 8/2001 |
| WO | WO 01/74003 | 10/2001 |
| WO | WO 01/86948 | 11/2001 |
| WO | WO 02/11418 | 2/2002 |
| WO | WO 02/11446 | 2/2002 |
| WO | WO 02/17642 | 2/2002 |
| WO | WO 02/097997 | 12/2002 |
| WO | WO 03/032620 | 4/2003 |
| WO | WO 03/039154 | 5/2003 |
| WO | WO 2004/023717 | 3/2004 |
| WO | WO 2004/032514 | 4/2004 |
| WO | WO 2004/036808 | 4/2004 |
| WO | WO 2004/036892 | 4/2004 |
| WO | WO 2004/098190 | 11/2004 |

OTHER PUBLICATIONS

Scientific-Atlanta, Inc. Pending U.S. Appl. No. 10/008,581, filed Nov. 13, 2001, entitled "Networked Subscriber Television Distribution," Inventors: Samuel H. Russ, David B. Lett, Jonathan A. Robinson, and Michael A. Gaul.

U.S. Appl. No. 10/104,921, filed Mar. 22, 2002, Entitled "Exporting Data from a Digital Home Communication Terminal to a Client Device," Inventors: Gaul, et al.

Final Office Action mailed Jul. 25, 2008 for U.S. Appl. No. 10/342,670.

Non-Final Office Action mailed Apr. 24, 2008 for U.S. Appl. No. 10/104,921.

Kerr, G., "A Review of Fully Interactive Video on Demand" Signal Processing. Image Communication, Elsevier Science Publishers, Amsterdam, NL, vol. 8, No. 3, Apr. 1996, pp. 173-190, XP004047063 ISSN: 0923-5965.

Alexis De Lattre et al., Videolan Streaming (online) Feb. 12, 2005, pp. 1-14 (Cited by Examiner, no copy available).

Alexis De Lattre et al., Videolan Streaming Howto, 2005, pp. 1-61 (Cited by Examiner, no copy available).

Microsoft Computer Dictionary, 1999, Microsoft Press, 4th Edition, p. 123.

U.S. Appl. No. 09/332,244; Ellis et al., filed Jun. 11, 1999 is included by reference by 2005/0028208 (Not published).

U.S. Appl. No. 10/008,581, filed Nov. 13, 2001, Entitled "Networked Subscriber Television Distribution," Inventors: Russ, et al.

U.S. Appl. No. 10/212,017, filed Aug. 2, 2002, Entitled "Locally-Updated Interactive Program Guide," Inventors: Russ et al.

U.S. Appl. No. 10/263,270, filed Oct. 2, 2002, Entitled "Video Transmission Systems and Methods for a Home Network," Inventors: Robertson et al.

U.S. Appl. No. 10/342,670, filed Jan. 15, 2003, Entitled "Networked Multimedia System," Inventors: Robertson et al.

U.S. Appl. No. 10/403,485, filed Mar. 31, 2003, Entitled "Networked Multimedia System having a Multi-Room Interactive Network Guide," Inventors: Russ et al.

U.S. Appl. No. 10/998,879, filed Nov. 29, 2004, Entitled "Consolidating Video on Demand (VOD) Services with Multi-Room Personal Video Recording (MR-PVR) Services," Inventors: Schutte, et al.

U.S. Appl. No. 10/294,947, filed Nov. 14, 2002, Entitled "Networked Subscriber Television Distribution," Inventors: Russ, et al.

U.S. Appl. No. 10/676,968, filed Oct. 1, 2003, Entitled "Proximity Detection using Wireless Connectivity in a Communications System," Inventors: Claussen, et al.

U.S. Appl. No. 11/069,440, filed Mar. 1, 2005, Entitled "Interactive Network Guide with Parental Monitoring," Inventors: Ostrowska, et al.

U.S. Appl. No. 10/924,077, filed Aug. 23, 2004, Entitled "Full Duplex Wideband Communications System for a Local Coaxial Network," Inventors: Robertson, et al.

U.S. Appl. No. 10/842,823, filed May 11, 2004, Entitled "Networked Multimedia Overlay System," Inventor: P. J. Claussen.

U.S. Appl. No. 11/564,347, filed Nov. 29, 2006, Entitled "Viewer Data Collection in a Multi-Room Network," Inventor: Russ, Samuel H.

U.S. Appl. No. 11/162,232, filed Sep. 2, 2005, Entitled "Multiroom Point of Deployment Module," Inventors: Wall, et al.

U.S. Appl. No. 10/923,948, filed Aug. 23, 2004, Entitled "Optimization of a Full Duplex Wideband Communications System," Inventors: Robertson, et al.

U.S. Appl. No. 11/069,439, filed Mar. 1, 2005, Entitled "Parental Control for a Networked Multi-Room System," Inventors: Ostrowska, et al.

U.S. Appl. No. 10/036,329, filed Feb. 25, 2008, Entitled "Full Duplex Wideband Modem Communications system for a Local Coaxial Network," Inventors: Robertson, et al.

* cited by examiner

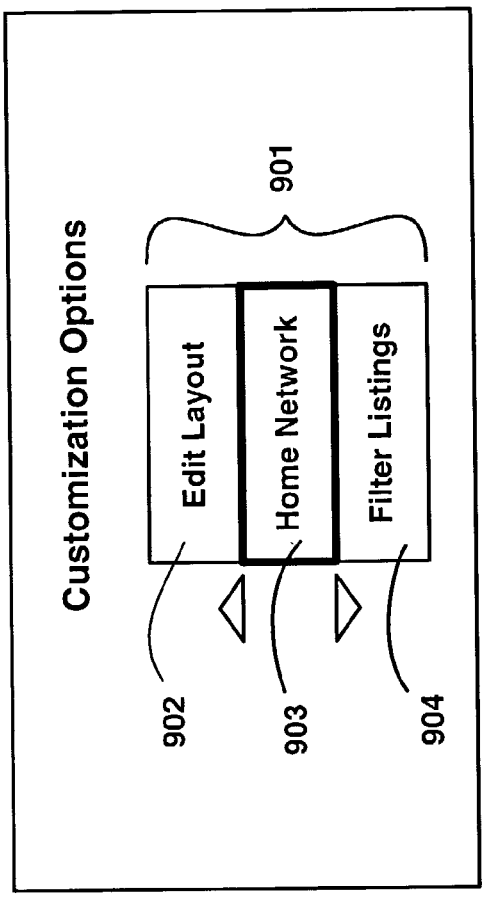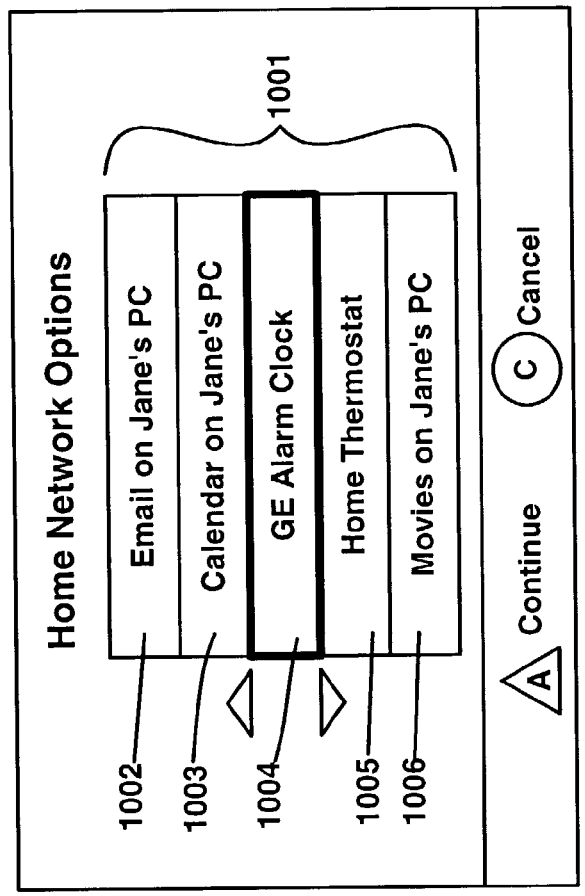

LOCALLY-UPDATED INTERACTIVE PROGRAM GUIDE

FIELD OF THE INVENTION

This invention relates in general to television systems, and more particularly, to the field of electronic program guides.

BACKGROUND OF THE INVENTION

Cable television systems are now capable of providing many services in addition to analog broadcast video. In implementing enhanced programming, the home communication terminal ("HCT"), otherwise known as the settop box, has become an important computing device for accessing various video services. In addition to supporting traditional analog broadcast video functionality, digital HCTs (or "DHCTs") now also support an increasing number of two-way digital services such as video-on-demand.

A DHCT is typically connected to a cable or satellite television network and includes hardware and software necessary to provide various services and functionality. Some of the software executed by a DHCT can be downloaded and/or updated via the cable television network. Each DHCT also typically includes a processor, communication components and memory, and is connected to a television or other display device. While many conventional DHCTs are stand-alone devices that are externally connected to a television, a DHCT and/or its functionality may be integrated into a television or other device, as will be appreciated by those of ordinary skill in the art.

Many DHCTs provide users with television program information via electronic program guides (EPGs). Some EPGs automatically scroll through television channel listings to present program information that corresponds to respective channels and time periods. Other EPGs, also known as interactive program guides (IPGs), allow a user to scroll through and/or search available program information by providing input commands via a remote control device. As many DHCT users spend substantial amounts of time watching television and browsing through IPG listings, they have become very adept and comfortable at using IPGs. However, IPGs are often underutilized in conventional systems. Therefore, there exists a need to expand IPG functionality to provide users with easy and convenient systems and methods for accessing desired information.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

FIG. 9 depicts a non-limiting example of a customization options screen that may be presented to a user after the user activates the "C" key on the remote control device depicted in FIG. 3.

FIG. 10 depicts a non-limiting example of a Home Network Options screen that may be presented to a user after the user selects the "Home Network" option via the customization options screen depicted in FIG. 9.

DETAILED DESCRIPTION OF THE PREFERRED EMBODIMENTS

Preferred embodiments of the present invention will be herein described in the context of a digital home communication terminal (DHCT) that is coupled to a subscriber television system (STS). In accordance with one implementation, the DHCT provides a user with a locally updated interactive program guide (IPG) that contains television presentation listings that were received by the DHCT via the STS, as well as other listings that were not received via the STS. These other listings may be based on data provided by user input or by a local device. The local device may be, for example, a personal computer (PC), a consumer electronics device, or a home appliance, among others. If the local device is a PC, then the IPG may, for example, include listings that correspond to a functionality provided by a software program that is running on the PC.

Figure 1:
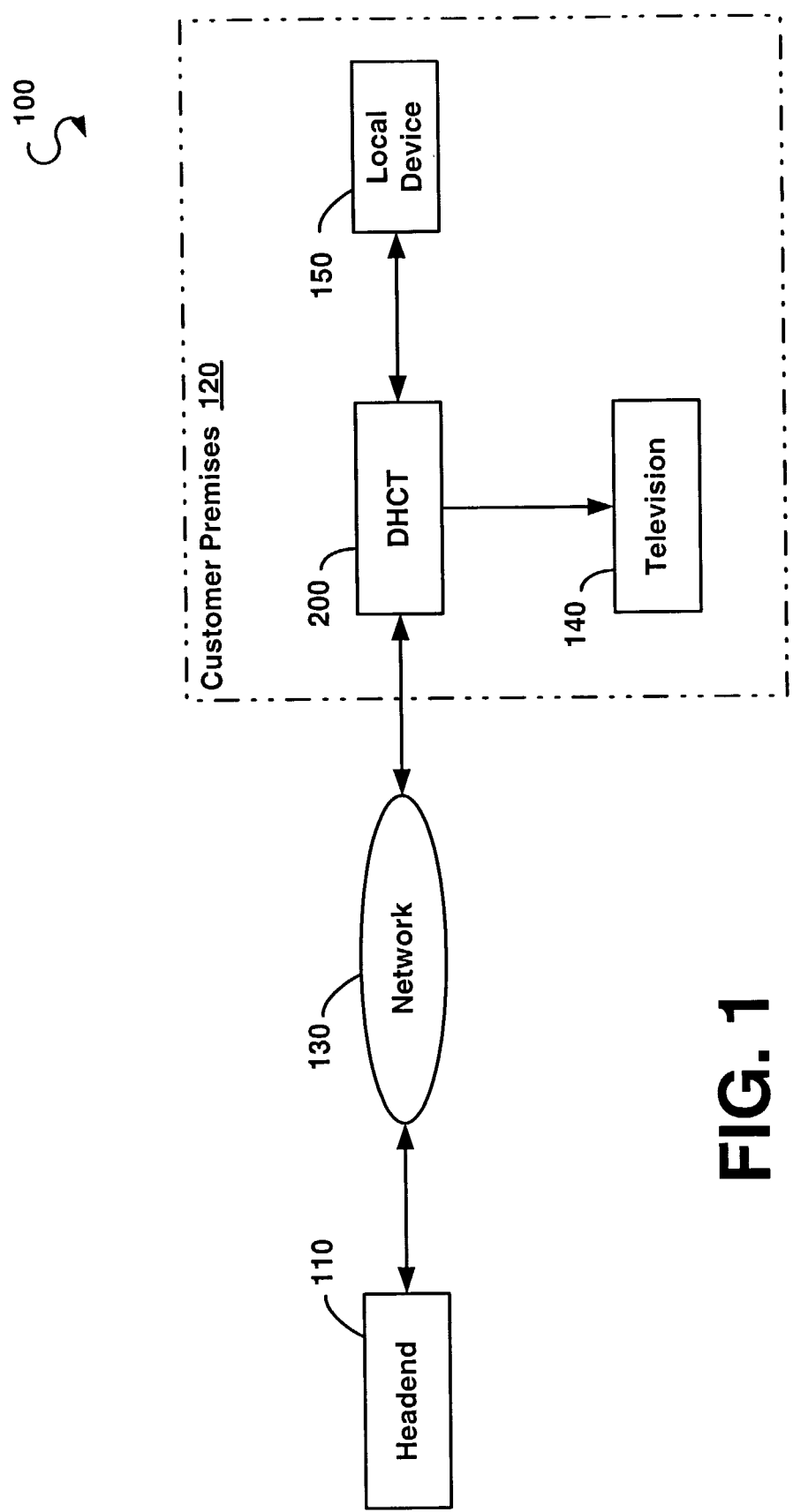
FIG. 1 is a block diagram depicting a non-limiting example of a subscriber television system.
Figure 2:
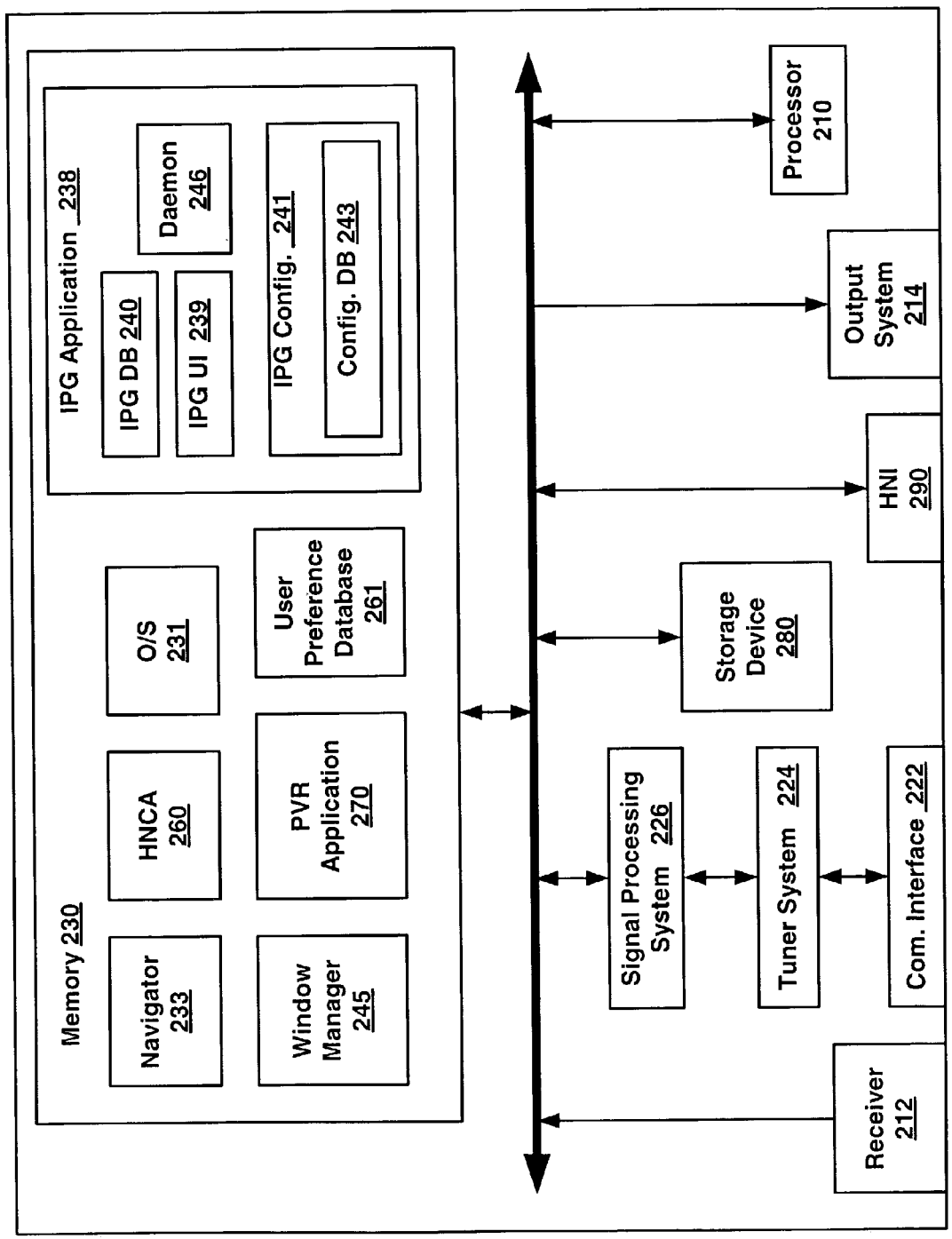
FIG. 2 is a block diagram depicting a non-limiting example of selected components of the DHCT depicted in FIG. 1.
Figure 3:
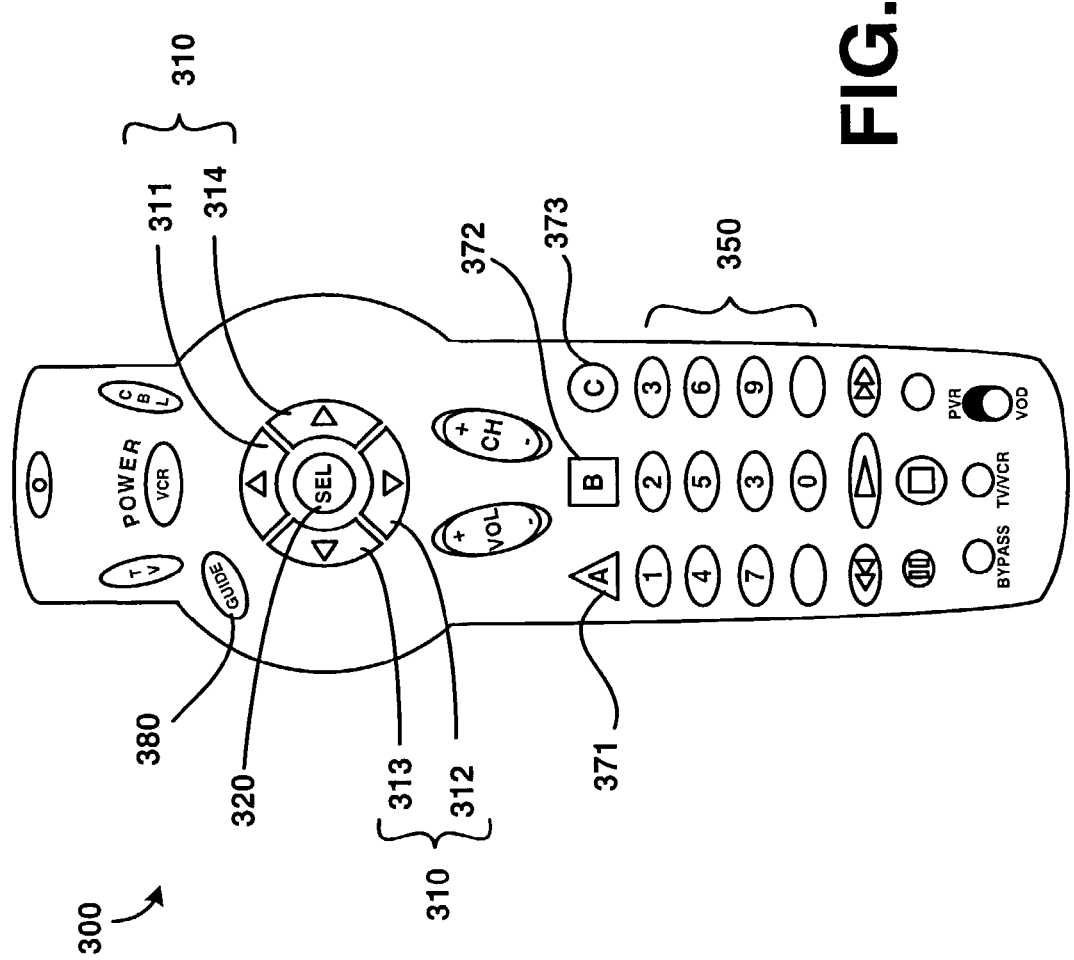
FIG. 3 depicts a non-limiting example of a remote control device that may be used to provide user input to the DHCT depicted in FIG. 2.
Figure 16:
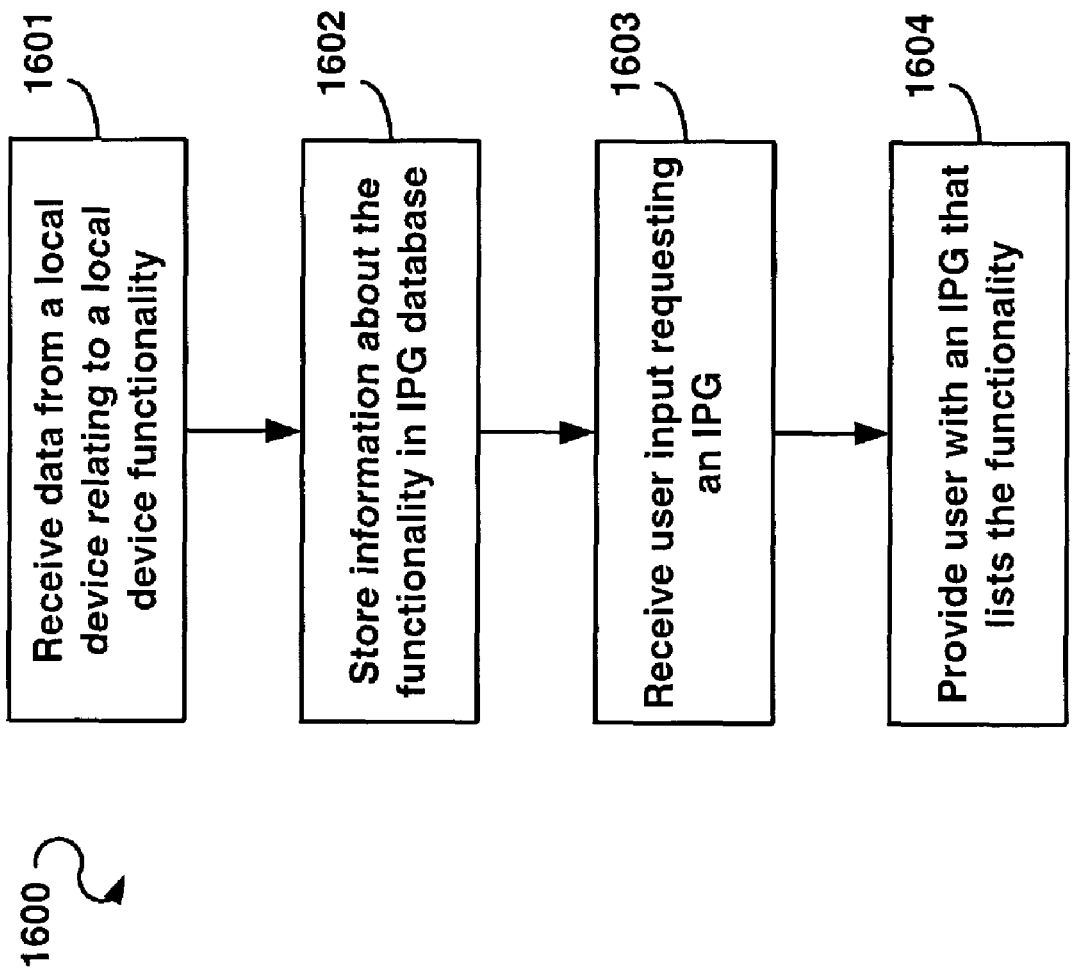
FIG. 16 is a flow chart depicting a non-limiting example of a method for providing an IPG in accordance with one embodiment of the present invention.

Below is a detailed description of the accompanying figures (FIGS. 1-16), which illustrate a preferred embodiment of the present invention: FIGS. 1-3 illustrate examples of system components that may be used to help provide a locally-updated IPG; FIGS. 4-7, 9-11, and 14 illustrate examples of user interface (UI) screens related to locally-updated IPGs; FIGS. 8, 12, 13, and 15 illustrate examples of locally-updated IPGs;

and FIG. 16 illustrates an exemplary method for implementing a locally-updated IPG. Note that all examples given herein are intended to be non-limiting, and are provided in order to help convey the scope of the invention. Therefore, the invention, which may be embodied in many different forms, should not be construed as limited to the examples set forth herein.

FIG. 1 is a block diagram depicting a non-limiting example of a subscriber television system (STS) 100. In this example, the STS 100 includes a headend 110 and a DHCT 200 that are coupled via a communications network 130. The DHCT 200 is typically situated at a customer premises 120 and may be a stand-alone unit or integrated into another device such as, for example, a television 140. The customer premises 120 may be a residence or place of business, among others. The DHCT 200 receives signals (video, audio and/or other data) from the headend 110 through the network 130 and provides reverse information to the headend 110 through the network 130. The network 130 may be any suitable means for communicating television services data including, for example, a cable television network or a satellite communication network, among others. The headend 110 may include one or more server devices (not shown) for providing video, audio, textual data, and/or software programming to local devices such as DHCT 200. The headend 110 and the DHCT 200 cooperate to provide a user with television services via the television 140. The television services may include, for example, broadcast television services, cable television services, premium television services, video-on-demand (VOD) services, and/or pay-per-view (PPV) services.

A local device 150 capable of communicating with the DHCT 200 is also located at the customer premises 120. The local device 150 provides one or more functionalities to a user and may be for example, a desktop computer, a notebook computer, a personal digital assistant (PDA), a thermostat, an alarm clock, a home security system, a kitchen appliance, a lamp, a light fixture, a television, an audio player, a video cassette recorder (VCR), a digital video disc (DVD) player, and a home appliance, among others. Information about a functionality provided by the local device 150 is transmitted from the local device 150 to the DHCT 200 where it is effectively stored in IPG database 240. The DHCT 200 subsequently provides this information to a user as part of an interactive program guide (IPG) that is presented via the television 140, as illustrated, for example, in FIGS. 12, 13, and 15.

Examples of how a DHCT 200 may discover a local device 150 include the following scenarios, among others:

1) The DHCT 200 acts as a source of IP addresses using a Dynamic Host Configuration Protocol (DHCP). This approach may involve a local device 150 contacting the DHCT 200 to obtain an IP address.

2) The DHCT 200 may synchronize with a local device 150 (e.g., a computer) that supports plug-and-play operation.

3) One or more local devices 150 are specifically programmed to contact the DHCT 200 to register themselves with it.

4) The DHCT 200 is informed of the existence of a local device 150 via information provided by user input. The DHCT 200 uses this information to contact the local device 150.

Preferably, once the DHCT 200 is aware of the existence of a local device 150, then the two units may communicate using a suitable communications protocol. The DHCT 200, in one embodiment, may query the local device 150 about the latter's capabilities. Furthermore, the DHCT 200 may use information received from the local device 150 to compose a user-interface screen for providing instructions to the local device 150. In one embodiment, the DHCT 200 communicates with the local device 150 using one or more residential networking standard such as, for example, Bluetooth, CAL, CEBus, Convergence, emNET, HAVi, HomePNA, HomePlug, HomeRF, Jini, LonWorks, UPnP, 802.11A, 802.11B, 802.11G, 802.15.3 and VESA, among others.

FIG. 2 is a block diagram illustrating a non-limiting example of selected components of a DHCT 200. The DHCT 200 comprises a communications interface 222 for receiving video, audio and other data from the headend 110 (FIG. 1), and for providing reverse information to the headend 110. The DHCT 200 further includes at least one processor 210 for controlling operations of the DHCT 200, an output system 214 for driving a display device (e.g., a television 140), and a tuner system 224. The tuner system 224 tunes to a particular television service to be displayed via the television 140 and sends and receives various types of data to/from the headend 110. The tuner system includes in one implementation, an out-of-band tuner for bi-directional quadrature phase shift keying (QPSK) data communication and a quadrature amplitude modulation (QAM) tuner for receiving television signals. A receiver 212 receives user inputs that are provided via an input device such as, for example, a transmitter with buttons or keys located on the exterior of the terminal, a hand-held remote control device, or a keyboard.

A home network communications application (HNCA) 260 communicates with a local device 150 via a home network interface (HNI) 290. The HNI 290 acts as an interface for transmitting and/or receiving data to/from a local device 150. The HNI 290 may comprise, for example, a USB (Universal Serial Bus) connector, an Ethernet port, an IEEE-1394 connection, a serial port, a parallel port, a wireless radio frequency (RF) interface, a telephone line interface, a power line interface, a coaxial cable interface, and/or an infra-red (IR) interface, among others. In one possible implementation, the HNI 290 may be coupled to a local device via an Ethernet hub. A driver for the HNI 290 may be included in the operating system (O/S) 231 or may otherwise be stored in memory 230.

Memory 230, which may include volatile and/or non-volatile memory, stores one or more programmed software applications, herein referred to as applications, which contain instructions that may be executed by the processor 210 under the auspices of the operating system 231. Data required as input by an application is stored in memory 230 and read by processor 210 from memory 230 as need be during the course of the application's execution. Input data for an application may be data stored in memory 230 by a secondary application or other source, either internal or external to the DHCT 200, or may be data that was created with the application at the time it was generated as a software application program. Data transmitted by the headend 110 may be received via the communications interface 222, whereas user input may be received from an input device via receiver 212. Data generated by an application is stored in memory 230 by processor 210 during the course of the application's execution. Availability, location and amount of data generated by one application for consumption by another application is communicated by messages through the services of the operating system 231.

The IPG application 238 displays a program guide to the user and populates the guide with information about television functionalities. The IPG 238 includes an IPG user interface module 239 component that creates an IPG for presentation to the user. The IPG user interface module 239 accesses configuration settings stored in an IPG configuration module 241 to implement an appropriate configuration for the IPG. The IPG configuration module 241 includes a configuration database 243 for storing a plurality of IPG configurations. The IPG user interface module 239 populates the IPG with information contained in an IPG database 240. The IPG database 240 contains data files corresponding to current and future services and/or functionalities that are or will be available via the DHCT 200 and/or other local devices.

Based on the configuration information stored in the IPG configuration module 241, the IPG user interface module 239 utilizes the window manager 245 and other graphics utilities provided by the operating system 231 to render an IPG on the television 140. The window manager 245, which may also be part of the operating system 231, contains functionality for allocating screen areas and managing screen use among multiple applications. The operating system 231 provides primitives to the IPG user interface module 239 in order to help render images on the television 140 (FIG. 1).

As a window is generated on a display device, the IPG user interface 239 registers with the window manager 245 in order to receive particular user input commands that may be required for selecting options provided by the newly-created window. The IPG 238 also contains a daemon application 246 that forwards IPG data received from the headend 110 or the local device 150 to the IPG database 240. Such IPG data may include information about services and functionalities that are provided by the DHCT 200 and/or the local device 150.

A PVR application 270, in cooperation with an appropriate device driver, may effect the storage of a video stream that is received from a local device 150 in a storage device 280. The PVR application 270 may also effect the retrieval and presentation of a video stream including the provision of trick mode functionality such as fast forward, rewind, and pause.

The IPG application 238, the HNCA 260, the PVR application 270, and all other applications executed by the resources of the DHCT 200 comprise executable instructions for implementing logical functions. The applications can be embodied in any computer-readable medium for use by or in connection with an instruction execution system. The instruction execution system may be, for example, a computer-based system, a processor-containing system, or any other system capable of executing instructions. In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, solid-state, magnetic, optical, electromagnetic, infrared, or semiconductor system, apparatus, device, or propagation medium, either internal to the DHCT 200 or externally connected to the DHCT 200 via one or more communication ports or network interfaces. More specific examples (a non-exhaustive list) of the computer-readable medium would include the following: an electrical connection (electronic) having one or more wires, a portable computer diskette (magnetic), a hard drive storage device (magnetic), a random access memory (RAM) (solid-state device), a read-only memory (ROM) (solid-state device), an erasable programmable read-only memory (EPROM or Flash memory) (multiple devices), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 8:
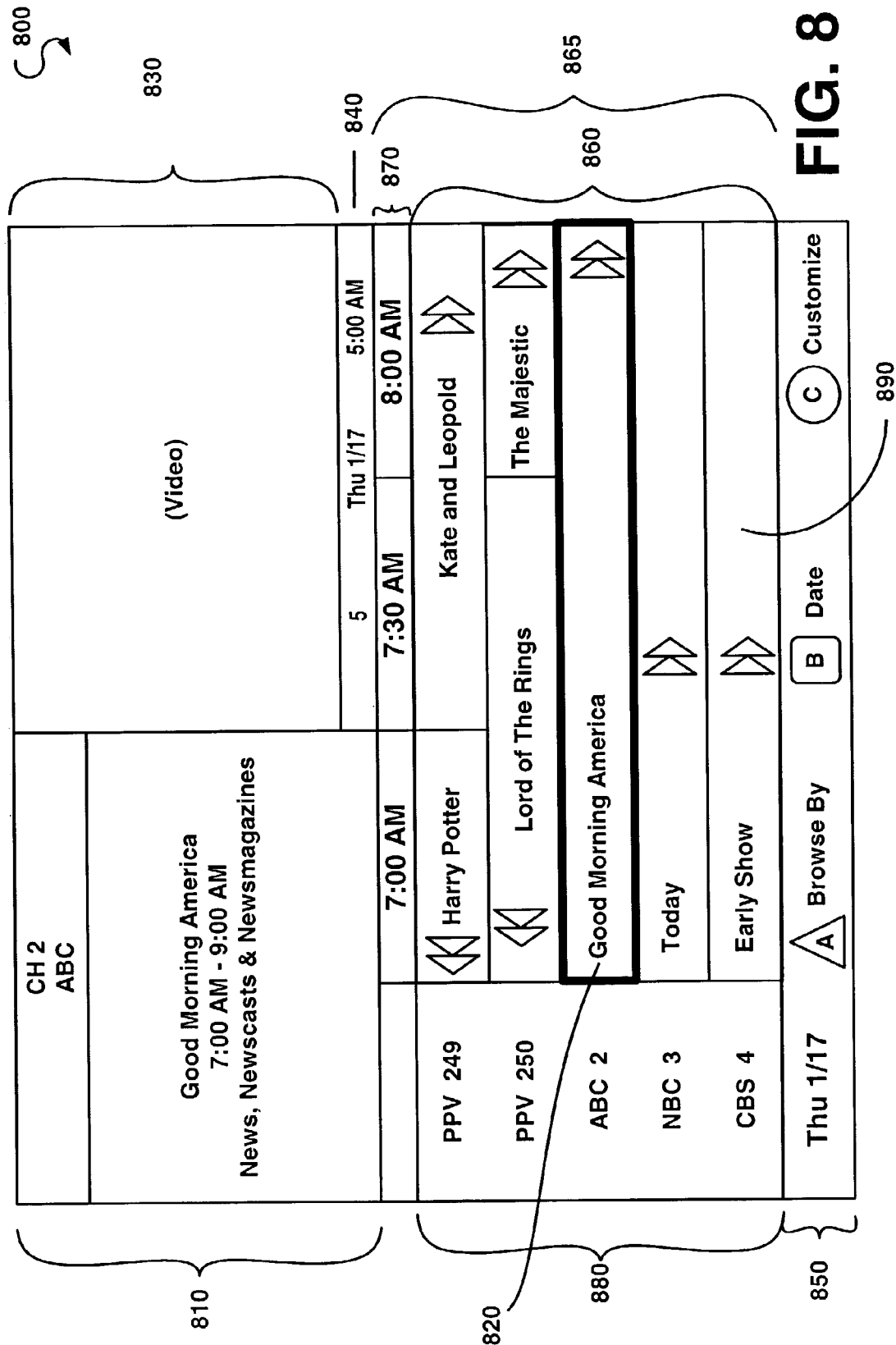
FIG. 8 depicts a non-limiting example of an IPG screen that illustrates an initial program guide arrangement in a time format.

FIG. 3 depicts a non-limiting example of a remote control device 300 that may be used to provide user input to the DHCT 200. The remote control device 300 described herein is merely illustrative and should not be construed as implying any limitations upon the scope of the present invention. Four arrow keys 310 are provided including an up arrow key 311, a down arrow key 312, a left arrow key 313, and a right arrow key 314. The arrow keys 310 can be used to scroll through on-screen options and/or to highlight an on-screen option, whereas the select key 320 may be used to select a currently highlighted option. The guide key 380 may be used to access a television program guide such as, for example, IPG screen 800 (FIG. 8). The function of the "A" key 371, the "B" key 372, and the "C" key 373 varies depending on the screen being presented to a user at the time of a key's activation. In one embodiment, the "A" key 371 can be used to access a browse-by list for requesting an IPG screen that contains a subset of service instances falling under a user selected browse-by category such as, for example, comedy, drama, action/adventure, sports, etc.; the "B" key 372 can be used to request an IPG screen containing service listings for a user selected date; and the "C" key 373 can be used to initiate a process for customizing an IPG.

In an alternative embodiment of the invention, different and/or additional systems and methods of providing user input may be used including, for example, a remote control device having different keys and/or key layouts, a keyboard device, a mouse, a voice activated input system, a touch-screen display, etc. The invention described herein is not limited by the type of device used to provide user input.

Figure 4:
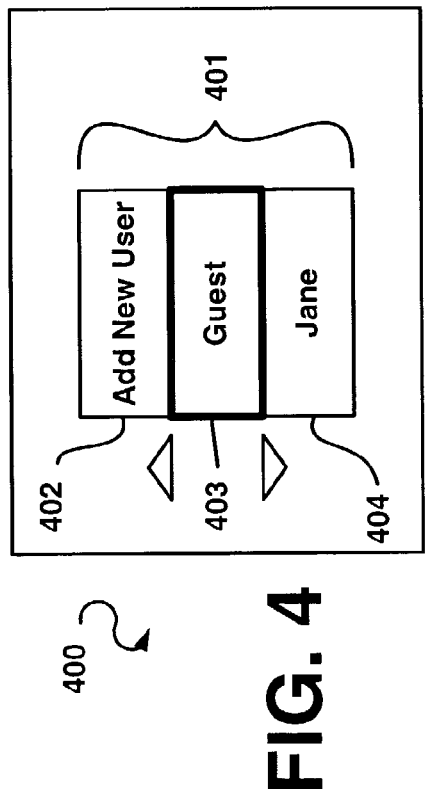
FIG. 4 depicts a non-limiting example of a user selection screen that may be presented to a user after the user turns on the DHCT and/or after the user requests an IPG.

FIG. 4 depicts a non-limiting example of a user selection screen 400 that may be presented to a user by the IPG application 238 (FIG. 2) after the user turns on the DHCT 200 and/or after the user requests an IPG. A user may request an IPG by, for example, activating the Guide key 380 (FIG. 3). The user selection screen 400 has a user selection list 401 that includes one or more options for identifying the user. In the current example, the user selection list 401 includes the following options: "Add New User" 402, "Guest" 403, and "Jane" 404. The Add New User option 402 may be used to create a new profile for a user. The Guest option 403 may be used to avoid specifically identifying the user. The Jane option 404 corresponds to a previously created user profile. A user profile may be stored in, for example, the user preference database 261 (FIG. 2).

Figure 5:
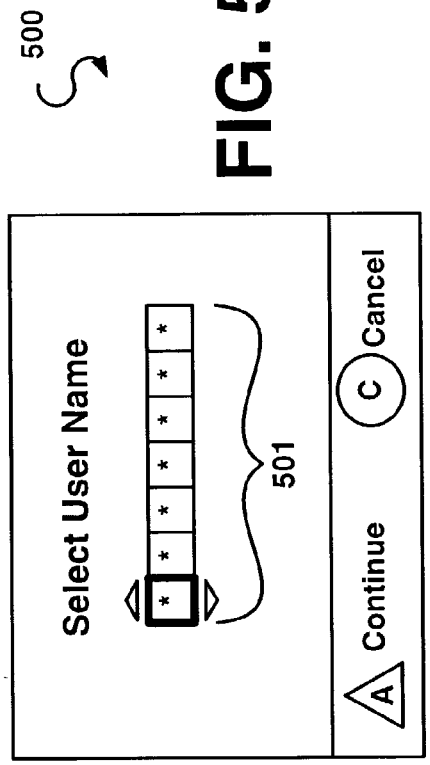
FIG. 5 depicts a non-limiting example of a name entry screen that may be presented to a user after the user selects the "Add New User" option depicted in FIG. 4.

FIG. 5 depicts a non-limiting example of a name entry screen 500 that may be presented to a user by the IPG application 238 (FIG. 2) after the user selects the Add New User option 402 (FIG. 4). The name entry screen 500 includes name entry fields 501 that may be used to enter a user name. In one implementation, a user may enter a user name by using the left and right arrow keys 313 and 314 (FIG. 3) to highlight a desired entry field, and the up and down arrow keys 311 and 312 (FIG. 3) to scroll to a desired character in the highlighted entry field. In another implementation, another input device such as, for example, a keyboard may be used to input a user name. After the user has entered a desired user name, the user may activate the "A" key 371 (FIG. 3) to proceed to a subsequent screen.

Figure 6:
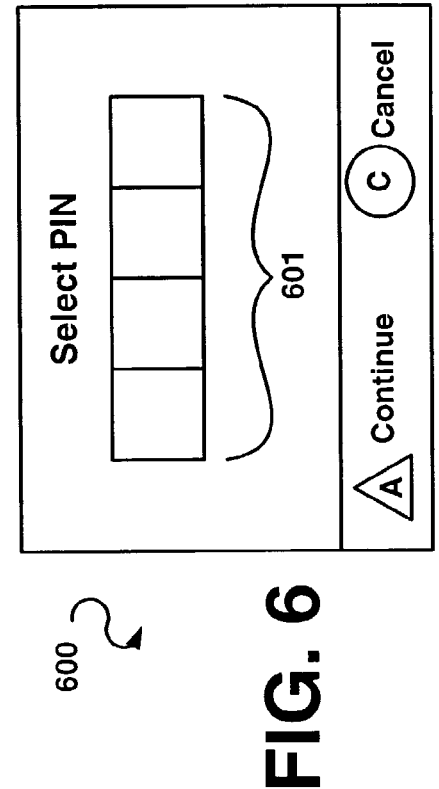
FIG. 6 depicts a non-limiting example of a Personal Identification Number (PIN) selection screen that may be presented to a user after the user selects a user name via the name entry screen depicted in FIG. 5.

FIG. 6 depicts a non-limiting example of a Personal Identification Number (PIN) selection screen 600 that may be presented to a user by the IPG application 238 (FIG. 2) after the user selects a user name via the name entry screen 500 (FIG. 5). The PIN selection screen 600 includes PIN entry fields 601 that may be used to enter a user PIN. In one implementation, a user may enter a user PIN by using the number pad 350 on the remote control device 300 (FIG. 3).

The PIN that is selected by the user is stored in the user preference database 261 (FIG. 2) and is associated with the user name that was entered by the user via the name entry screen 500. The next time that a user wants to sign-in, the user identifies a desired user name via the user selection screen 400 (FIG. 4) and then enters a corresponding PIN via a PIN entry screen 700 (FIG. 7).

Figure 7:
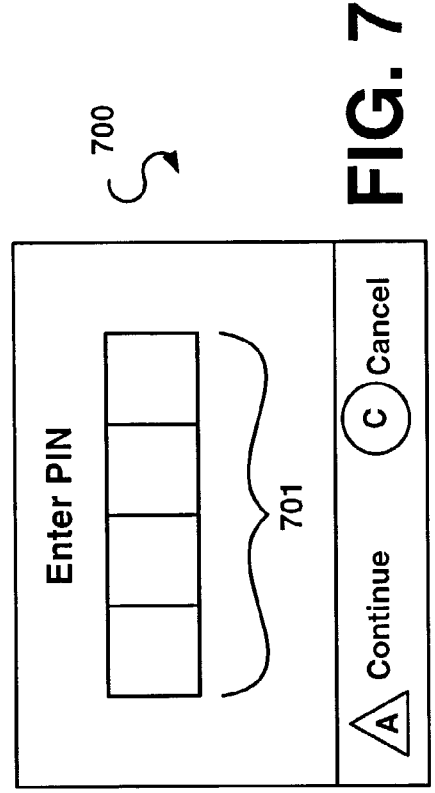
FIG. 7 depicts a non-limiting example of a PIN entry screen that may be presented to a user after the user selects a user name via the name entry screen depicted in FIG. 5.

FIG. 7 depicts a non-limiting example of a PIN entry screen 700 that may be presented to a user by the IPG application 238 (FIG. 2) after the user selects a user name via the name entry screen 500 (FIG. 5). The PIN entry screen 700 includes PIN entry fields 701 that may be used to enter a user PIN. In one implementation, a user may enter a user PIN by using the number pad 350 on the remote control device 300 (FIG. 3). The PIN that is entered by the user is then compared with the PIN corresponding to the user name identified by the user. If the PINs are determined to be identical, then the user is signed-in under the user name. If the PINs are not identical, then the user is asked to re-renter the PIN. Once the user is signed-in, then customized DHCT 200 settings that were implemented during previous sessions when the user was signed-in are restored. Customized DHCT 200 settings that may be restored include, for example, settings for determining the content and/or layout of an IPG.

FIG. 8 depicts a non-limiting example of an IPG screen 800 that illustrates an initial program guide arrangement in a time format. IPG screen 800 may be presented by IPG application 238 in response to user input that may be provided via, for example, the activation of the guide key 380 (FIG. 3). IPG application 238 works in cooperation with window manager 245 to present a user with IPG screens that are formatted in accordance with IPG configuration data that is stored in configuration database 243. Furthermore, an IPG application 238 may retrieve information from IPG database 240 as needed for presentation via an IPG screen. The top left portion of IPG screen 800 is a detailed focus area 810 that includes detailed information for a currently highlighted functionality instance listing which, in the current example, is the Good Morning America listing 820. The detailed functionality instance listing information may include channel number, functionality name (e.g., ABC), functionality instance listing name (e.g., Good Morning America), functionality instance listing description, functionality instance listing duration, and/or any episode information or rating.

Video corresponding to the television channel to which the DHCT 200 is currently tuned (for which audio may also be playing, and which typically corresponds to a television presentation occupying the full screen before the user is presented with IPG screen 800) is displayed in a video area 830. Immediately below the video area 830 is an information banner 840 for displaying the television channel number corresponding to the television channel to which the DHCT 200 is currently tuned (e.g., 5), the current day and date (e.g., Thursday, January 17), and the current time (e.g., 5:00 a.m.).

An IPG grid 865 includes a main listing display area 860, a time area 870, and a functionality identification area 880. The main listing display area 860 contains listings of functionality instances that correspond to respective television functionalities identified in functionality identification area 880 and that, in some cases, are or will be available during the time periods listed in the time area 870. The functionality identification area 880 includes a vertical list of television functionalities organized sequentially from top to bottom by increasing television channel number (except for the highest numbered television functionality which is typically listed immediately above the lowest numbered television functionality). In one embodiment, the arrow buttons 310 (FIG. 3) can be used to scroll through the main listing display area 860 and to highlight a desired functionality instance listing. As a user scrolls in time across a calendar day boundary, the day and date indications displayed in various areas are updated.

Though other implementations are contemplated within the scope of the present invention, when the IPG application is first activated by the user, the lowest numbered television functionality is typically centered in the functionality identification area 880. In this non-limiting example, the lowest numbered television functionality in the functionality identification area 880 is ABC (channel number 2). Continuing with this non-limiting example, the left-most time column in the main listing display area 860 includes titles of functionality instance listings scheduled to be available about two hours into the future with the middle title in the column being highlighted and corresponding to the lowest numbered television functionality. Therefore, in this example, the Good Morning America listing 820, which is scheduled to be provided via ABC (channel number 2), is highlighted. It should be noted that the current functionality instance listing shown in video area 830 and referenced in information banner 840, corresponds to the currently tuned television channel (channel number 5), and not to the channel corresponding to the currently highlighted functionality instance listing 820. The bottom area 850 of IPG screen 800 indicates the selected day for which functionality instance listing data is being displayed as well as information about the current functions of the "A", "B", and "C" keys on the remote control 300. In an alternative embodiment, an IPG screen may have fewer, additional, and/or different components and may have a different layout. For example, an IPG screen might not include a detailed focus area 810, a video area 830, an information banner 840, and/or a bottom area 850.

FIG. 9 depicts a non-limiting example of a customization options screen 900 that may be presented by the IPG application 238 (FIG. 2). The customization options screen may be presented to a user in response to the activation of the "C" key 373 (FIG. 3) during the presentation of the IPG screen 800 (FIG. 8). The customization options screen 900 has a customization options list 901 that includes one or more options for modifying the content or layout of an IPG screen. In the current example, the customization options list 901 includes the following options: an "Edit Layout" option 902, a "Home Network" option 903, and a "Filter Listings" option 904. The "Edit Layout" option 902 may be selected in order to edit the layout of an IPG screen. The "Home Network" option 903 may be selected in order to add functionality instance listings corresponding to a device located at a customer premises 120 (FIG. 1). The "Filter Listings" option 904 may be selected to limit the listings provided via an IPG based on user determined settings.

FIG. 10 depicts a non-limiting example of a Home Network Options screen 1000 that may be presented by the IPG application 238 (FIG. 2) to a user after the user selects the "Home Network" option 903 via the customization options screen 900 (FIG. 9). The Home Network Options screen 1000 has a home network options list 1001 that includes one or more options for modifying the content or layout of an IPG screen. In the current example, the home network options list 1001 includes the following options: "Email on Jane's PC" option 1002, "Calendar on Jane's PC" option 1003, "GE Alarm Clock" option 1004, "Home Thermostat" option 1005, and "Movies on Jane's PC" option 1006. The "Email on Jane's PC" option 1002 corresponds to a functionality that allows access to e-mail messages via a local computer. The "Calendar on Jane's PC" option 1003 corresponds to a functionality that allows access to an electronic calendar via a local computer. The "GE Alarm Clock" option 1004 corresponds to a functionality provided by a local alarm clock. The "Home Thermostat" option 1005 corresponds to a functionality provided by the a local thermostat. The "Movies on Jane's PC" option 1006 corresponds to movies or portions thereof that are accessible via a local computer.

Each of the options 1002-1006 corresponds to a functionality that is offered by a local device that is capable of communicating with the DHCT 200 (FIG. 1). Information displayed via the Home Network Options screen 1000 may be retrieved from IPG database 240 where it may have been stored by the HNCA 260 upon being received by the DHCT 200 from a local device 150. Such information may be received from a local device 150 in response to a query by the HNCA 260 or may be periodically broadcast by the local device 150 over a home network to which the local device 150 and DHCT 200 are coupled. As used herein, the term "local," when used in reference to a device or apparatus, means located at the same customer premises as the DHCT 200. A user may select an option from the options list 1001 in order to request that the functionality identified by the selected option be listed in an IPG. An option that is selected by a user is identified as having been selected via, for example, a distinctive icon and/or background color. In one embodiment a selected option is identified via a check mark icon that is displayed in the same field as the selected option, as illustrated in the example shown in FIG. 11.

In one embodiment of the invention, the functionalities that are listed via the Home Network Options screen 1000 are customized based on the specific user that is currently signed-in for the DHCT 200. Therefore, in the current example, the Home Network Options screen 1000 is presented to a person who is signed-in using the user name "Jane."

Figure 11:
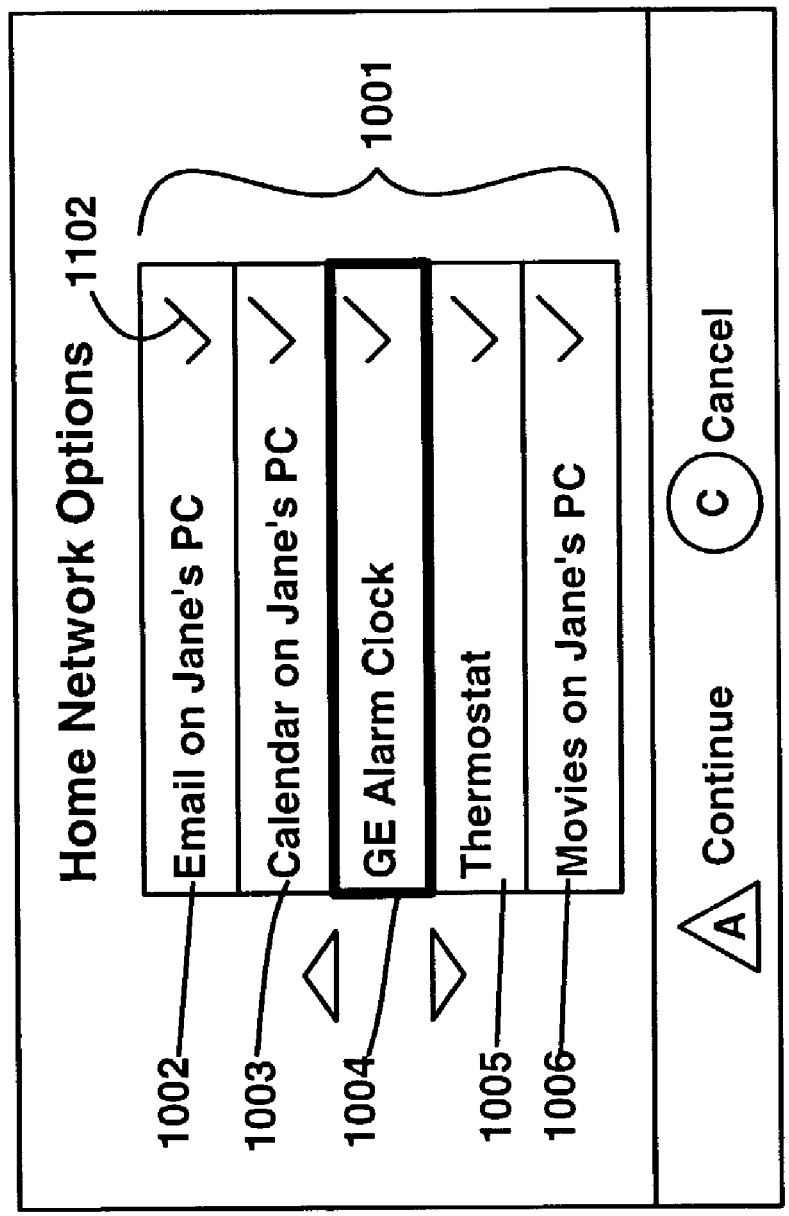
FIG. 11 depicts a non-limiting example of a Home Network Options screen that may be presented to a user after the user selects options available via the Home Network Options screen depicted in FIG. 10.

FIG. 11 depicts a non-limiting example of a Home Network Options screen 1100 that may be presented to a user after the user selects options 1002-1006 via the Home Network Options screen 1000 depicted in FIG. 10. Each of the options 1002-1006 is identified as having been selected via a check mark icon 1102 that is displayed in the same field as the option. A user may un-select a selected option by highlighting the option using an arrow key 310 (FIG. 3) and by activating the select key 320 while the option is highlighted. After the user has completed his selections from the Home Network Options screen 1100, the user may confirm the selections via, for example, the "A" key 371 (FIG. 3). The selections made by the user are stored in a user preference database 261 (FIG. 2) and are used by the IPG application 238 (FIG. 2) in determining whether a functionality is to be listed in an IPG.

Figure 12:
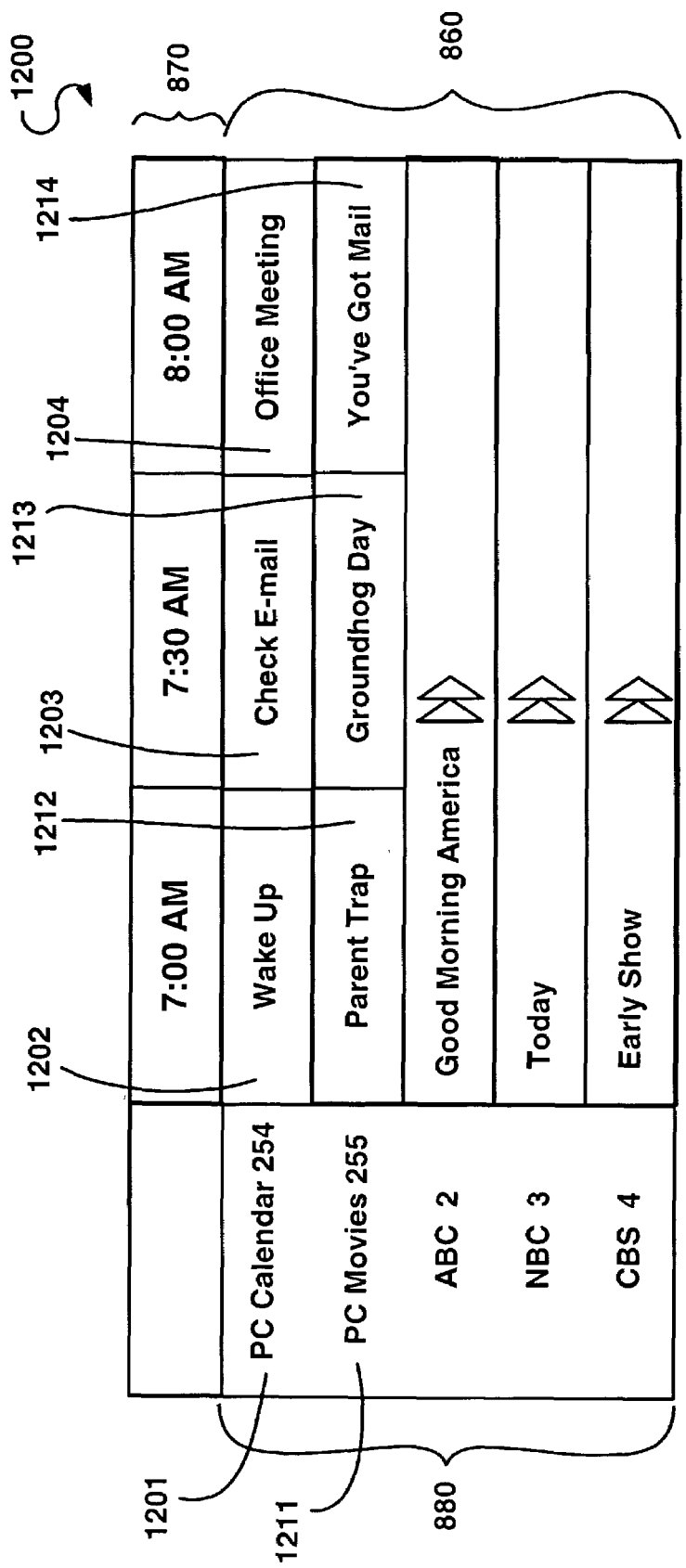
FIG. 12 depicts a non-limiting example of an IPG grid that may be presented to a user after the user confirms the selection made via the Home Network Options screen depicted in FIG. 11.

FIG. 12 depicts a non-limiting example of an IPG grid 1200 that may be presented to a user after the user confirms the selection made via the Home Network Options screen 1100 (FIG. 1). The IPG grid 1200 may be presented as part of an IPG that includes additional components as illustrated, for example, in FIG. 8. IPG grid 1200 identifies PC functionalities 1201 and 1211 that are available via a local computer. Functionality instance listings that correspond to the "PC Calendar" functionality 1201 (which has an assigned channel number 254) include, in this example, "Wake Up" 1202, "Check E-mail" 1203, and "Office Meeting" 1204. Functionality instance listings that correspond to the "PC Movies" functionality 1211 (channel 255) include, in this example, "Parent Trap" 1212, "Groundhog Day" 1213, and "You've Got Mail" 1214. The PC Calendar functionality instance listings 1202-1204 correspond to entries in an electronic calendar contained in a local PC. Similarly, the PC Movies functionality instance listings 1212-1214 correspond to movies that are available via a local PC.

The PC Calendar functionality instance listings 1202-1204 have respective time characteristics that are represented by the corresponding time entries in the time area 870. The PC Movies functionality instance listings 1212-1214, on the other hand, do not have such time characteristics, even though the listings 1212-1214 may be displayed below respective time entries. In one embodiment, time entries in the time area 870 are not displayed when one of the functionality instance listings 1212-1214 is highlighted.

A user may request a functionality instance (e.g., a movie), or additional information pertaining to a functionality instance (e.g., a calendar entry) by selecting a corresponding functionality instance listing. A user selection may be effected via a remote control device such as, for example, the remote control 300 (FIG. 3). In response to the selection of a functionality instance listing, the IPG application 238 and/or another application may provide the user with the additional information or content identified by the selected listing. Such additional information or content may have been previously received and stored by the DHCT 200 or may be requested from the local device 150 by the HNCA 260 in response to the user selection.

If a user selects a functionality instance corresponding to a movie that is stored on the local device 150, then the HNCA 260 may request such movie from the local device 150. When the DHCT 200 receives a video stream corresponding to the requested movie, then the PVR application 270, in cooperation with an appropriate device driver, may effect the storage of the video stream in the storage device 280. The PVR application 270 may also effect the retrieval and presentation of the requested movie including the provision of trick mode functionality such as fast forward, rewind, and pause.

Data identifying PC functionality instance listings may be imported by the HNCA 260 (FIG. 2) from a local device 150 using a suitable messaging protocol. The local device 150 may include software for selecting, assembling, formatting, and transmitting relevant data to the DHCT 200. As a non-limiting example, among others, if the local device 150 is a PC, then it may include Microsoft Exchange Server software for transmitting calendar and e-mail instance listings to the HNCA 260, which may include an Exchange client.

Figure 13:
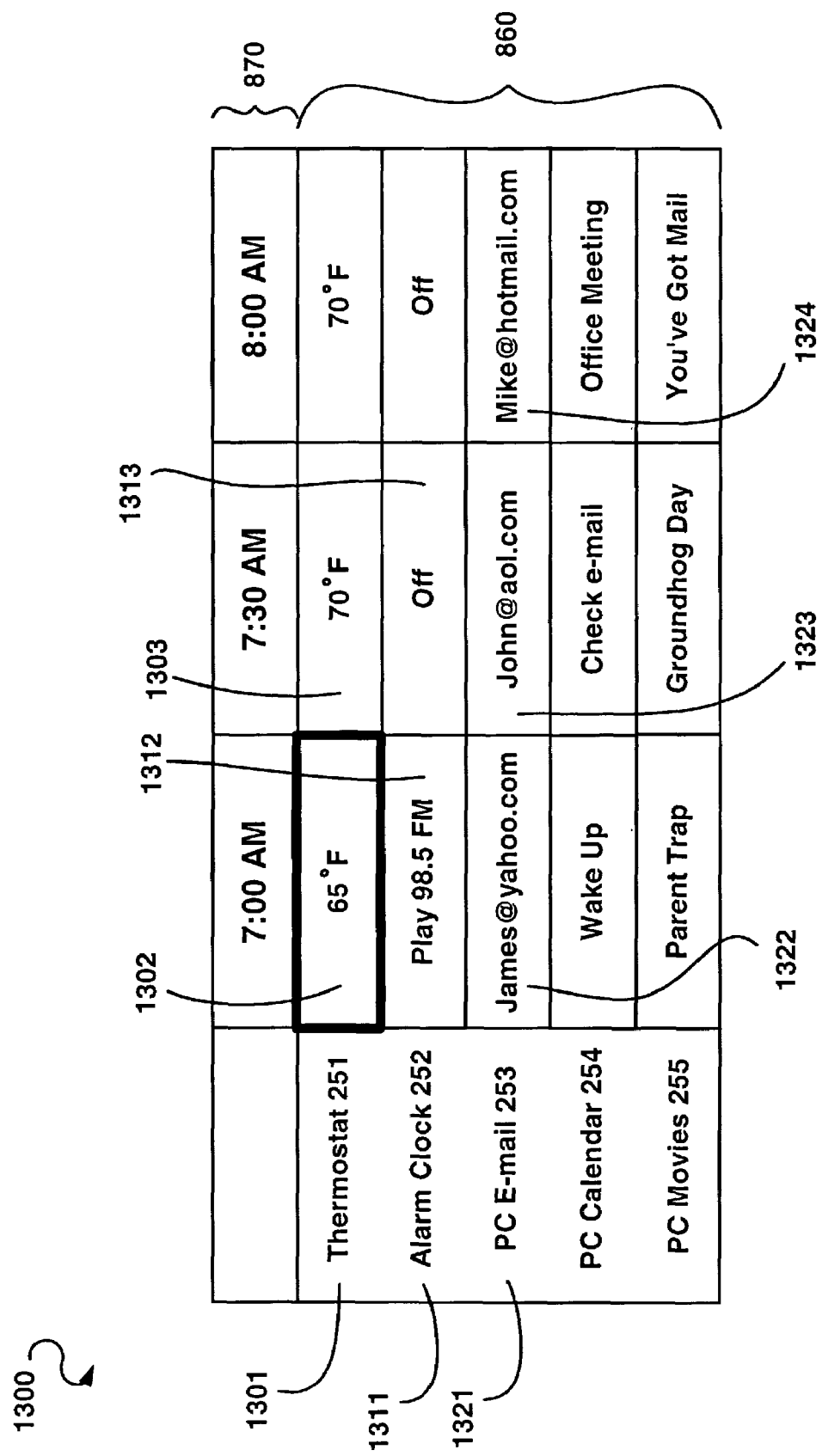
FIG. 13 depicts a non-limiting example of an IPG grid that may be presented to a user after the user scrolls up the IPG grid depicted in FIG. 12.

FIG. 13 depicts a non-limiting example of an IPG grid 1300 that may be presented to a user after the user scrolls up the IPG grid 1200 (FIG. 12). A user may scroll up an IPG grid by activating, for example, the up arrow key 311 (FIG. 3). In this example, the functionality listings "Thermostat" 1301, "Alarm Clock" 1311, and "PC E-mail" 1321 are included in the IPG grid 1300. In the current example, functionality instance listings that correspond to the Thermostat functionality 1301 include "65° F." 1302 and "70° F." 1303; functionality instance listings that correspond to the Alarm Clock functionality 1311 include "Play 98.5 FM" 1312 and "Off" 1313; and functionality instance listings that correspond to the PC E-mail functionality 1321 include "james@yahoo.com" 1322, "john@aol.com" 1323, and "mike@hotmail.com" 1324. The thermostat functionality instance listings 1302 and 1303 identify the temperature settings that a local thermostat is scheduled to have during half-hour time periods beginning at 7:00 a.m. and 7:30 a.m., respectively. Similarly, the alarm clock functionality instance listings 1312 and 1313 identify the alarm clock settings for the half-hour time periods beginning and 7:00 a.m. and 7:30 a.m., respectively. The PC E-mail functionality instance listings 1322-1324 identify e-mail addresses of respective senders of e-mail messages that are available via a local device 150. The PC E-mail functionality instance listings 1322-1324 do not have time characteristics that are represented by the time entries in the time area 870. Therefore, in one embodiment, time entries in the time area 870 are not displayed when one of the functionality instance listings 1322-1324 is highlighted.

In accordance with one embodiment of the invention, a user may view data corresponding to a functionality instance (e.g. an e-mail message) by selecting the corresponding functionality instance listing. In accordance with another embodiment of the invention, a user may request a screen for modifying a functionality instance setting by selecting the corresponding functionality instance listing.

Figure 14:
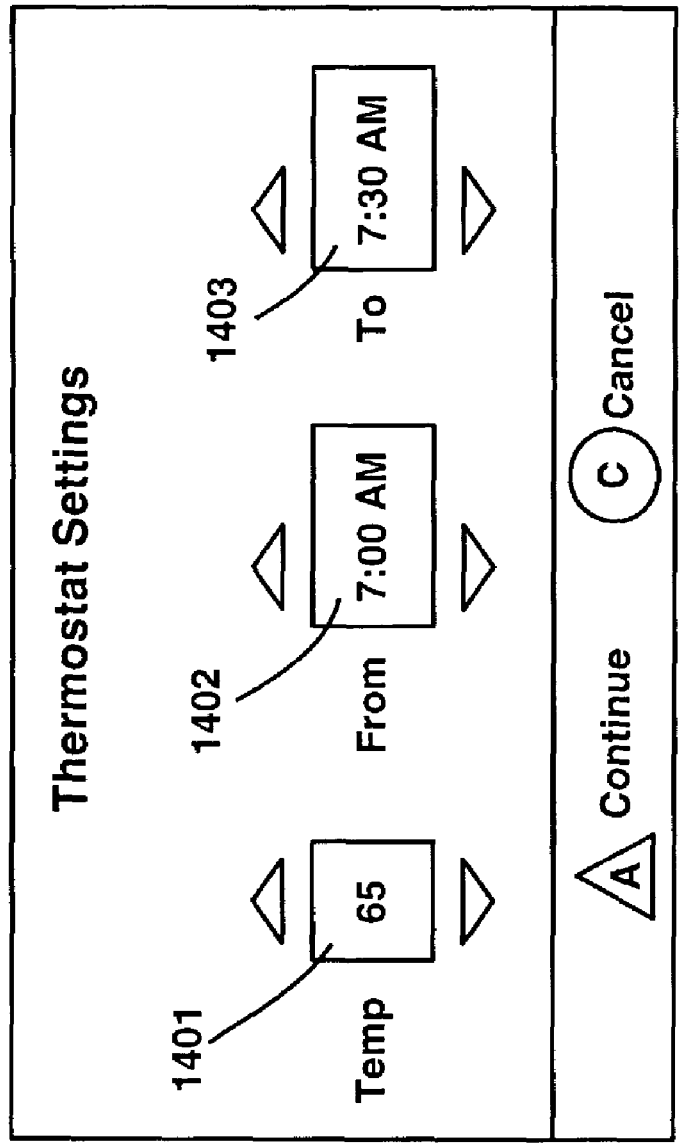
FIG. 14 depicts a non-limiting example of a thermostat settings screen that may be presented to a user in response to a user selecting the functionality instance listing while being presented with the IPG grid depicted in FIG. 13.

FIG. 14 depicts a non-limiting example of a thermostat settings screen 1400 that may be presented to a user in response to a user selecting the functionality instance listing 1302 while being presented with the IPG grid 1300 (FIG. 13). The thermostat settings screen 1400 includes a temperature setting field 1401 and time settings fields 1402 and 1403. The temperature setting field 1401 may be used to specify a temperature setting for a local thermostat, whereas the time settings fields 1402 and 1403 may be used to specify a beginning and end, respectively, of a time window during which the temperature setting is to be in effect. After the desired thermostat settings are selected by a user, the user may then confirm the setting by activating, for example, the "A" key 371 (FIG. 3). After the thermostat settings are confirmed by a user, they are communicated by the DHCT 200 to the local thermostat using a suitable messaging protocol. The local thermostat, implements the settings upon receiving them from the DHCT 200. A user may also be able to modify settings pertaining to other functionalities such as, for example, the alarm clock functionality 1311, by selecting a corresponding functionality instance listing.

Figure 15:
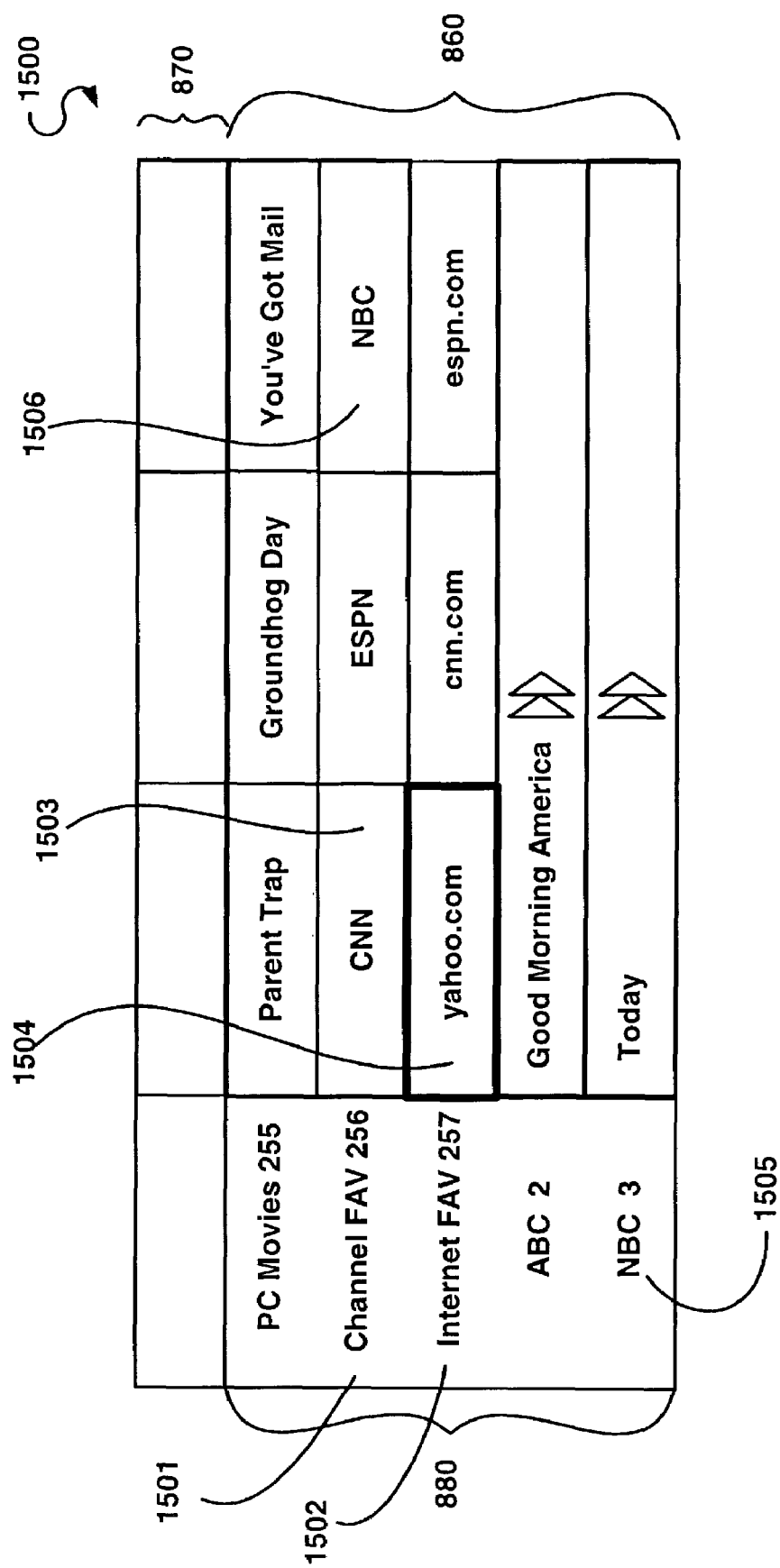
FIG. 15 depicts a non-limiting example of an IPG grid that may be presented to a user by the DHCT depicted in FIG. 2.

FIG. 15 depicts a non-limiting example of an IPG grid 1500 that lists a favorite channels functionality 1501 and a favorite internet sites functionality 1502. The favorite channels functionality 1501 and the favorite internet sites functionality 1502 are provided using favorites data stored in the user preference database 261 (FIG. 2). Alternatively, the favorites data may be downloaded from a local device 150 (FIG. 1). As a non-limiting example, favorites data that are downloaded from a PC may include a list of favorite web-sites that are stored in PC memory by an Internet browser. The favorites data may be based on preferences expressed by a user or based on an analysis of functionalities provided to a user over a period of time. A user may request a functionality instance by selecting a corresponding listing (e.g., the CNN listing 1503 or the yahoo.com listing 1504). Note that a functionality listing and a functionality instance listing may correspond to the same entity. As a non-limiting example, the NBC functionality listing 1505 and the NBC functionality instance listing 1506 both correspond to NBC.

FIG. 16 is a flow chart depicting a non-limiting example of a method for providing an IPG in accordance with one embodiment of the present invention. In step 1601, the DHCT 200 (FIG. 1) receives data from a local device 150 (FIG. 1) relating to a functionality that is provided by the local device 150. After receiving the data from the local device 150, the DHCT 200 stores the data in a designated file or database such as, for example, in IPG database 240, as indicated in step 1602. In step 1603, the DHCT 200 receives user input requesting an IPG. The user input may be provided via, for example, the guide key 380 (FIG. 3). In response to receiving the user input, the DHCT 200 provides in step 1604 an IPG that lists the functionality implicated in step 1601. The IPG that is provided by the DHCT 200 may also include listings of television presentations that are scheduled to be broadcast within a certain time period. Depending on the particular implementation, a user may be required to scroll through the IPG in order to view a functionality listing corresponding to a desired functionality. In one embodiment, whether a functionality is listed in an IPG is based on user preference settings stored in the user preference database 261 (FIG. 2).

Any blocks or steps shown in FIG. 16 represent modules, segments, or portions of code which include one or more executable instructions for implementing specific logical functions or steps in a process. In an alternative implementation the functions or steps depicted in the flowchart may be executed out of order from that shown or discussed, including substantially concurrently or in reverse order, depending on the functionality involved, as would be understood by those reasonably skilled in the art.

The functionality provided by the method illustrated in FIG. 16, can also be implemented through hardware (e.g., an application specific integrated circuit (ASIC) and supporting circuitry). Each implementation may have a perceived advantage, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

The functionality provided by the method illustrated in FIG. 16, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanner, and transferred into the computer's memory or storage.

It should be emphasized that the above-described embodiments of the present invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method for providing an interactive program guide (IPG) via a digital home communication terminal (DHCT) located at a customer premises, the method comprising steps of:

receiving a plurality of listings of a first type via a subscriber television network;

receiving data related to at least one local device capable of communicating with the DHCT;

providing a user with an IPG, the IPG including a first IPG menu screen that includes the plurality of listings of the first type and at least one listing of a second type corresponding to the data related to the at least one local device, wherein the plurality of listings of the first type and the at least one listing of the second type are displayed as elements in an IPG grid; and providing, within the IPG, an option for a user to access a second IPG menu screen, the second IPG menu screen including at least one designation associated with the at least one local device, wherein the second IPG menu screen enables the user to select the at least one designation to be accessible to a user through the first IPG menu screen, wherein the data related to the at least one local device includes personal calendar information from a computer.

2. The method of claim 1, wherein responsive to receiving data related to a plurality of local devices capable of communicating with the DHCT, the second IPG menu screen includes a plurality of designations associated with the plurality of local devices, wherein the second IPG menu screen enables the user to select a plurality of designations to be accessible to the user through the first IPG menu screen.

3. The method of claim 1, wherein the IPG grid is configured to display a plurality of time entries responsive to a user highlighting one of the listings of the plurality of listings of the first type.

4. The method of claim 3, wherein the IPG grid is further configured to omit display of time entries responsive to the user highlighting the at least one listing of the second type.

5. The method of claim 1, further comprising providing a user selection screen, the user selection screen configured to enable the user to select an IPG configuration based on user identity.

6. The method of claim 5, further comprising providing a Personal Identification Number (PIN) screen, the PIN screen configured to receive user input related to a PIN.

7. The method of claim 6, further comprising responsive to receiving a user's PIN, accessing a database to confirm the user's identity.

8. The method of claim 1, further comprising:
receiving user input requesting that a functionality instance be provided by the local device; and
responsive to receiving the user input, transmitting to the local device a message requesting that the functionality instance be provided.

9. The method of claim 1, wherein the subscriber television network includes at least one of the following: a cable television network or a satellite television network.

10. The method of claim 1, wherein the plurality of listings of the first type identify television presentations.

11. The method of claim 1, wherein the DHCT includes a television set-top terminal.

12. The method of claim 1, wherein the IPG comprises a grid having a plurality of time listings and a plurality of functionality listings.

13. The method of claim 1, wherein the computer is one of a personal digital assistant (PDA), a laptop computer, a desktop computer, or a multi-function mobile telephone.

14. A Digital Home Communication Terminal (DHCT) located at a customer premises, the DHCT comprising:
a communications interlace that receives functionality information from at least one local device, wherein the functionality information is related to a functionality of the local device;
logic configured to provide an Interactive Program Guide (IPG) that includes a first IPG menu screen including:
at least one television program listing; and
at least one listing related to the at least one local device; and
logic configured to provide a second IPG menu screen, the second IPG menu screen including:
at least one functionality related to the at least one local device; and
at least one user selectable option of displaying any number of functionality listings in the first IPG menu screen,
wherein the local device includes a computer, and
wherein the functionality is one of an electronic calendar functionality.

15. The DHCT of claim 14, wherein the program guide also lists a television functionality that is capable of being provided by the DHCT.

16. The DHCT of claim 14, wherein the functionality provided by the local device is provided other than via a video monitor.

17. A method for providing an interactive program guide (IPG) via a digital home communication terminal (DHCT) located at a customer premises, the method comprising steps of:
receiving a plurality of listings of a first type via a subscriber television network;
receiving data related to at least one local device configured to communicate with the DHCT;
providing a user with an IPG menu screen that includes the plurality of listings of the first type and at least one listing of a second type corresponding to the data related to the at least one local device, wherein the plurality of listings of the first type and the at least one listing of the second type are displayed as elements in an IPG grid, and wherein the first IPG menu screen includes at least one time indicator associated with the displayed elements of the IPG grid; and
in response to receiving user input for viewing functionality related to the at least one listing of the second type, removing the at least one time indicator associated with the displayed elements from the first IPG menu screen.

18. The method of claim 17, wherein the at least one local device includes at least one of the following: a thermostat, an alarm clock, and a home security system.

19. The method of claim 17, wherein the local device includes a computer.

* * * * *